(12) United States Patent
Lautenschläger et al.

(10) Patent No.: US 8,811,693 B2
(45) Date of Patent: Aug. 19, 2014

(54) METHOD AND SYSTEM FOR INDICATING A FEEDING VESSEL OF A MALFORMATION IN A MEDICAL IMAGE

(75) Inventors: Stefan Lautenschläger, Hausen (DE); Sigrid Ferschel, Uttenreuth (DE)

(73) Assignee: Siemens Aktiengesellschaft, Munich (DE)

(*) Notice: Subject to any disclaimer, the term of this patent is extended or adjusted under 35 U.S.C. 154(b) by 394 days.

(21) Appl. No.: 12/835,051

(22) Filed: Jul. 13, 2010

(65) Prior Publication Data

US 2012/0014573 A1 Jan. 19, 2012

(51) Int. Cl.
*G06K 9/00* (2006.01)
*G06T 7/00* (2006.01)

(52) U.S. Cl.
CPC .................... *G06T 7/0012* (2013.01)
USPC ........................................ 382/128

(58) Field of Classification Search
CPC ...................................... G06T 7/0012
USPC ............................................ 382/128
See application file for complete search history.

(56) References Cited

U.S. PATENT DOCUMENTS

| | | | | |
|---|---|---|---|---|
| 6,051,008 | A * | 4/2000 | Saadat et al. | 606/159 |
| 2002/0006216 | A1* | 1/2002 | Armato et al. | 382/131 |
| 2002/0045817 | A1* | 4/2002 | Ichihashi | 600/425 |
| 2007/0019846 | A1* | 1/2007 | Bullitt et al. | 382/128 |
| 2008/0114234 | A1* | 5/2008 | Gering | 600/411 |
| 2009/0015818 | A1* | 1/2009 | Ikeda et al. | 356/33 |
| 2010/0094118 | A1* | 4/2010 | Kobayashi et al. | 600/410 |
| 2011/0229004 | A1* | 9/2011 | Buelow et al. | 382/131 |

* cited by examiner

*Primary Examiner* — Neha Patel

(57) ABSTRACT

A method and a system for indicating a feeding vessel of a malformation in a medical image are provided. The method first displays the medical image of the malformation and its surrounding vessels. This enables a manual selects a portion of the displayed medical image with reference to the tumor. The feeding vessel of the tumor is segmented and finally indicated in the medical image based on said manual selection.

12 Claims, 7 Drawing Sheets

METHOD AND SYSTEM FOR INDICATING A FEEDING VESSEL OF A MALFORMATION IN A MEDICAL IMAGE

FIELD OF THE INVENTION

The present invention relates to the field of displaying medical images, particularly a method and system for indicating a feeding vessel of a malformation in a displayed medical image.

BACKGROUND OF THE INVENTION

Malformations are abnormal tissue growth formed inside an organ or a vessel, for examples the malformation can be a tumor in liver or uterus or fibroid in the uterus. Malformations can be treated using a minimally invasive treatment in interventional angiography, interventional oncology, interventional surgery, or interventional neuroradiology. For this treatment, a specialist, for example a physician inspects images that had been acquired before the treatment using diagnostic imaging techniques. These techniques can be for e.g. MR (Magnetic Resonance), CT (Computed Tomography) or angiographic acquisitions (X-ray Angiography), either 2-dimensional (2D) images or 3-dimensional (3D) volumes. One way to treat further growth of the malformations is by performing embolization, where the blood-flow to the malformation is reduced or even stopped by introducing an embolizing material into the feeding vessel of the malformation. For diagnosing, the physician needs to find the one or more feeding vessel which supply blood to the malformation. Also in the case of therapeutic procedures for the treatment, the placement of components, e.g. glue, microspheres, catheters etc. has to be placed ideally in the vessel and the injection of the therapeutic materials, for example the embolizing material has to be performed very precisely into the correct vessel.

There are vessels in the surrounding of the malformation which only supply blood to healthy tissue. It is another aim to reduce the number of these vessels from being cutoff the blood supply, since it would harm the healthy tissue. These vessels can be, for example, sub vessels of the main feeding vessel of the malformation. The father away the embolizing material is placed from the malformation itself, the more likely it becomes that many of these sub vessels supplying blood only to healthy surrounding tissue are affected by the treatment. With the currently available systems and tools, the correct placement of the catheter in the vessel to be treated is controlled visually in a contrast-enhanced acquisition with a series of live images during the interventional treatment, usually using a live X-ray image. After inspecting the images, the physician decides the further procedure, e.g. repositioning the catheter or releasing the embolizing material at the current catheter position. After positioning the catheter the physician releases the contrast agent which is deposited in one or more vessel which would be cutoff, as if the embolic material was released at the position of the catheter. This will indicate whether the right vessels are cutoff from the blood supply.

For every required repositioning one or more contrast-enhanced acquisition is made to verify the position of the catheter before releasing the embolic material. This process is repeated usually many times until the catheter is positioned correctly. For a patient undergoing this procedure, many X-ray images are acquired, leading to high dosage of radiation. The said multiple acquisitions taken for the repositioning require the use of a large amount of contrast agent. The high doses of radiation as well as the use of large amounts of contrast agent are not healthy for the patient. The repeated acquisition and analysis of the images to find the correct position of the catheter makes the procedure difficult and time consuming. Hence there is a need for faster treatment and precise positioning of therapeutic material or components, for example a catheter inside the feeding vessels for the treatment, at the same time reducing the radiation doses and reducing the use of contrast agents on the patient.

SUMMARY OF THE INVENTION

In view of the foregoing, an embodiment herein includes a method for indicating a feeding vessel of a malformation in a medical image. The method comprises displaying the medical image of a malformation and its surrounding vessels. The method further comprises manually selecting a portion of the displayed medical image in reference to the malformation. The feeding vessel of the malformation is segmented and indicating in the medical image.

In view of the foregoing, another embodiment herein includes a method for indicating a feeding vessel of a malformation in a medical image. The method comprises displaying the medical image of the malformation and its surrounding vessels. The method further comprises manually selecting a point in the feeding vessel of the malformation. The feeding vessel of the malformation is segmented and indicated in the medical image. The indication of the feeding vessel in the medical image includes indication of the selected point in the feeding vessel. The method also involves obtaining a live image of the malformation and the surrounding vessels during an intervention with a catheter to embolize the feeding vessel and overlaying the live image with the medical image. The live image can for example be overlaid with just extractions or results of the medical image, e.g. in form of a centerline of the feeding vessel or the results of segmentation of the feeding vessel.

In view of the foregoing, another embodiment herein includes a system for indicating a feeding vessel of a malformation in a medical image. The system comprises a display adapted to display the medical image having a malformation and its surrounding vessels. The system also has a selector to manually select a portion of the medical image in reference to the malformation and a processor for segmenting the feeding vessel of the malformation. The display is further adapted to indicate the segmented feeding vessel in the medical image.

According to the invention, a malformation and feeding vessel to the malformation is displayed in a display using a medical image. Based on a selection made on the medical image the feeding vessels of the malformation is segmented and indicated in the medical image, so that a user, for example a physician can perform any treatment planning using the indicated feeding vessel in the medical image. Currently, to perform embolization procedure, repeated contrast-acquisitions and analysis of the images are required to find the correct position of the catheter, which finally makes the procedure difficult and time consuming. Having the indication of the feeding vessel in the medical image as proposed in the invention, the physician can use the medical image to plan the catheter position or even simulate an embolization prior to the actual treatment thereby avoiding multiple contrast enhanced image acquisitions which otherwise would have been required. Avoiding multiple contrast enhanced image acquisitions reduces the risk of high dosage X-rays and contrast agents to the patient. Since the planning of the treatment can be done prior to the treatment the treatment itself can be made faster.

BRIEF DESCRIPTION OF THE DRAWINGS

Embodiments of the present invention are further described hereinafter with reference to illustrated embodiments shown in the accompanying drawings, in which.

DETAILED DESCRIPTION OF THE INVENTION

Figure 1:
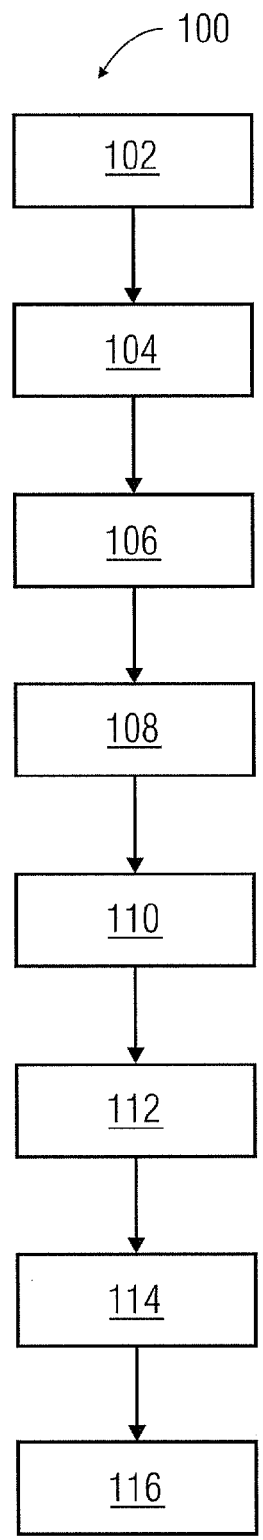
FIG. 1 illustrates a flow chart of a method for indicating a feeding vessel of a tumor in a medical image.

FIG. 1 illustrates a flow chart 100 of a method for indicating a feeding vessel of a tumor as an example of a malformation in a medical image. The method involves displaying a high resolution medical image of a tumor and its surrounding vessels at step 102. The surrounding vessel consists of a feeding vessel or a plurality of feeding vessels which supply blood to the tumor. The medical image is obtained using a commonly known medical 2D or 3D image acquisition. The 3D acquisition can be for example a 3D x-ray angiography, an MRI or a CT image acquisition; the 2D acquisition can be for example a digital angiography (DA) or a digital subtraction angiography (DSA). In a DSA a final medical image is generated as difference between two images, one with injecting a contrast agent and the other without injecting the contrast agent to the vessels.

At step 104, the physician manually selects a portion of the displayed medical image in reference to the position of the tumor. In the embodiment described in reference to FIG. 1, the portion of the medical image selected is the tumor itself. Either a part of the tumor can be selected or the whole tumor of the feeding vessel. The selection can be done by providing a marking on the medical image. The marking can be a line, circle or a contour encircling the tumor. The tumor will be an easy place for the physician to make a selection since the tumor will be clearly visible in the medical image. Since one objective of the method is to indicate the feeding vessels of the tumor, selection of the tumor will increase the chance of detecting most of the feeding vessels supplying blood to the tumor, since most of the feeding vessels will have a point of contact with the tumor.

At step 106, the feeding vessel of the tumor is segmented. The selection of the tumor at step 104, initiates the automatic segmentation of the tumor itself as well as the feeding vessels of the tumor. Different algorithms known to a person skilled in the art can be used to perform the segmentation. One way of perform segmentation of the feeding vessel is using the centerline of that feeding vessel. Here, the center line of the feeding vessel is first computed and the segmentation is then carried out. The centerline is calculated using a dedicated software tool, although, other algorithms known to person skilled in the art may be used to calculate the centerline of the feeding vessel feeding the malformation. By calculating the centerline of the feeding vessel information such as a maximum curvature of the feeding vessel, pathological changes, vessel overlapping and bifurcations are accurately and easily determined.

Another segmenting process that can be employed is a region growing algorithm. A point or a region in the tumor is first selected and the feeding vessel is then identified and segmented starting from the selected point or the region. The segmentation will not stop at the boundary of the tumor itself, but instead will be continued into the feeding vessels, which are the ones with a blood flow direction towards the tumor. Hence the accuracy of the segmentation using region growing algorithm can be reinforced by also identifying the blood flow direction in the feeding vessel which helps in choosing the right feeding vessels.

At step 108, the segmented feeding vessel is then indicated in the medical image. The segmented feeding vessel is indicated e.g. in a different color with respect to the background of the medical image. The same steps of segmentation and indication of the feeding vessels can be performed for multiple vessels if the displayed medical image comprises multiple feeding vessels for a tumor.

The feeding vessel can be a combination of a parent vessel and a plurality of sub vessels. The sub vessel are the once which bifurcates from the parent vessel wherein the sub vessel in the blood flow direction after a point of the bifurcation has a smaller diameter than the parent vessel. The parent vessel and the sub vessels, which originate from the same parent vessel, will be indicated e.g. with a variation in color. By indicating the parent vessel and the sub vessel in a different color, for example dark red for the parent vessel and light red for the sub vessels, it is easier to identify the different kinds of vessels. The physician can check whether the sub vessel also feeds the tumor or just healthy surrounding tissue, so that the physician can identify at which point the parent vessel can be embolized to minimize the number of sub vessels feeding only healthy tissue being cut-off from the blood supply.

At step 110, the physician selects a point in the segmented feeding vessel. It is to be understood that the physician described in the specification could also be a technical assistant or another user of the said method. The physician selects the point, for example, in the form of a dot or a marking in the medical image.

At step 112, the blood flow direction at the selected point is identified. The blood flow information can be identified using any method known to a person skilled in the art. One way of identifying the blood flow direction involves determining a diameter of the feeding vessel in at least two places along a length of the feeding vessel, wherein the blood flow direction is identified as the direction of a decreasing diameter of the feeding vessel. In the human body, the blood vessels are arranged to supply blood from the heart to organs, where the anatomical structure ensures that the diameter of the blood vessels in the direction of the blood flow decreases as the blood vessel approaches the organs. Hence determining the blood flow direction in the said way is easy and accurate.

There are several other ways to determine the direction of the blood flow by specialized methods of image acquisition using MRI, CT or x-ray devices. For example, it is known to determine the blood flow direction by a perfusion acquisition using a CT device. It is also known to determine the blood flow direction with an x-ray acquisition by a 2-dimensional digital subtraction angiography of by determining the arrival time of a contrast agent. These methods can also be used in the contrast of the current invention to identify the feeding vessel of the malformation within the plurality of vessels.

At step 114, based on the blood flow direction at the selected point in the feeding vessel a part of the feeding vessel is indicated in the blood flow direction after the point. The indicated part of the vessel corresponds to the region which would be blocked if the embolizing material would be released at that point. The method therefore can be used to simulate the effect of the embolization procedure on the feeding vessel and the point selected in step 110 corresponds to the point in the feeding vessel where the physician would like to inject an embolization material, for example using a catheter in this simulation. The simulation provides an advantage for the physician to plan well before the actual procedure so that no extra efforts are needed to find a proper point of embolization, which otherwise would have to be done using multiple contrast-enhanced acquisitions.

At step 116, sub vessel or plurality of sub vessels are segmented which are connected to the part of the feeding vessel in the blood flow direction after the point of selection and the same segmented sub vessel is indicated in the medical image. The part of the vessel in the blood flow direction after the selected point as well as the sub vessels connected to this part are indicated in the medical image in a distinct manner. These vessels will be cut off from the blood supply by embolizing the vessel at the selected point. Therefore this method simulates the entire effect of the embolizing treatment on the blood supply through the segmented feeding vessel, which includes the parent vessel and the sub vessels. The whole workflow can be realized as a software tool, running on a computer system. By segmenting and indicating the sub vessels the physician can visualize the feeding vessel structure in detail and accordingly plan the treatment more accurately, for example by avoiding cutting off sub vessels that supply blood to normal tissues during embolization.

The selected point in the segmented feeding vessel can be changed to a new position by the physician. The step 112 and step 114 previously mentioned can be performed for the new position. The said simulation can be done repeatedly for new points till a correct point is selected by the physician for embolization. The correct point is obtained by moving the point to a new location so as to reduce the cutoff of vessels which supply blood only to healthy tissue and increase the number of vessels which supply blood to the tumor which otherwise should have to be done using repeated contrast-enhanced image acquisitions.

Figure 2:
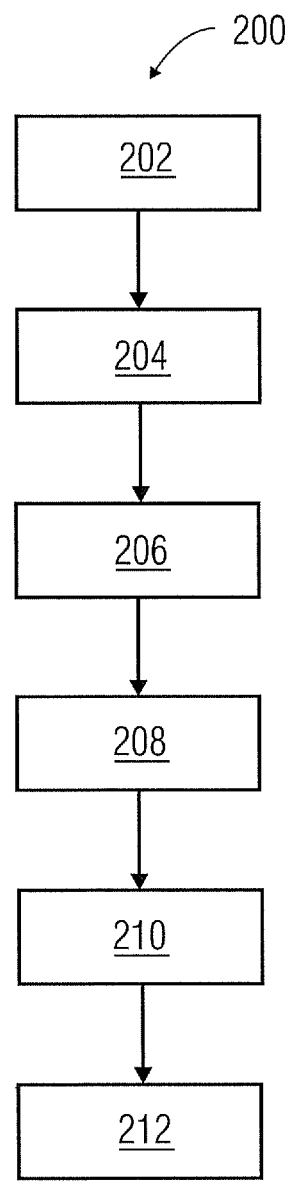
FIG. 2 illustrates a flowchart indicating a work flow, in which the selection of a portion of the displayed medical image comprises selecting a point in a feeding vessel.

According to another embodiment of the invention, FIG. 2 illustrates a flowchart 200 indicating a work flow when the selection of a portion of the displayed medical image comprises selecting a point in a feeding vessel. At step 202, the method involves displaying a medical image of a tumor and its surrounding vessels, similar to step 102 of FIG. 1. The method described in FIG. 2 corresponds very similar to FIG. 1, but defers from the method described in FIG. 1 in that after step 202 in which the medical image is displayed the steps 104 to step 108 are skipped to directly select the feeding vessel in the medical image by selecting a point in the feeding vessel similar to that described in step 110. At step 204, the physician selects the feeding vessel in the displayed medical image. The feeding vessel can for example be selected by selecting a point within the feeding vessel, wherein the point can be selected by a dot or any other suitable marking. At step 206, the selected feeding vessel is segmented. At step 208, the blood flow direction is identified. The segmentation of the feeding vessel and the identification of the blood flow direction can be done as explained in the previous embodiment with respect to FIG. 1. At step 210, the feeding vessel is indicated in the direction of the blood flow away from the selected point and at step 212, the sub vessels of the feeding vessel are segmented and indicated in the medical image, similar to that explained in FIG. 1. Selecting the feeding vessels helps to start working with the feeding vessels directly without any delay. In a medical image, where the feeding vessels of a tumor are well distinguished and clear, the said method of segmenting and indication of feeding vessel can be initiated by selecting the feeding vessel, which makes the method fast, by avoiding any specific algorithms to detect the feeding vessels at the first place.

FIG. 1 and FIG. 2 illustrates two distinct embodiments, but could also be treated as different workflows allowed as an alternative. The medical image is displayed as in steps 102 and 202 and then the method according to FIG. 1 is chosen by selecting the tumor whereas the method according to FIG. 2 is chosen by directly selecting the feeding vessel.

Figure 3:
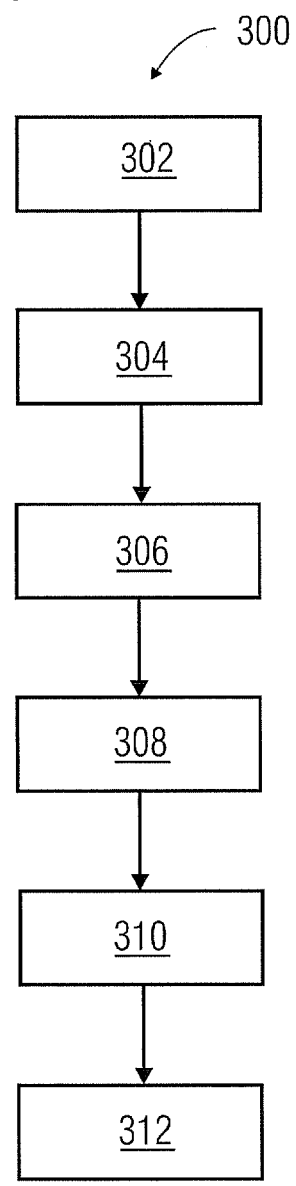
FIG. 3 illustrates a flow chart depicting the workflow to embolize a tumor feeding vessel.

FIG. 3 illustrates a flow chart 300 depicting the workflow to embolize a tumor feeding vessel. The following workflow describes a clinical case where the patient is treated for embolization of blood vessels in the heart. This should not be treated as a limitation, but similar methodology could be extended for embolization associated with other physiological structures.

At step 302, the medical image is obtained for which an intended catheter position was determined as explained in FIG. 1 or FIG. 2. At step 304 a live image is obtained for the same tumor and the surrounding vessels which is generally a low resolution 2-dimensional image. The live image is the one which is obtained at the time of actual treatment and will not or might not have any indications like the medical image.

At step 306, the live image is overlaid with the medical image to obtain a fused image. Generally fusing two images obtained for same part of an organ or tissue enables the visualization of all features in both the images in one single image. By first obtaining the high resolution medical image it is sufficient to only obtain low resolution live images, since the detailed anatomical structure of the tumor and the surrounding vessels is visible from the medical image in the fused image. The fused image, in this case will have components of both medical image and the live image. Since the medical image is a high resolution image indicating at least one feeding vessel and one or more subvessel of this feeding vessel, the fused image will have these components clearly visualized on it with respect to the live image, so that a physician can see the planned positions and indications clearly before he proceeds with the actual intervention. Based on the indications in the medical image, the fused image can show segmented feeding vessels, the planned point for embolization, the part of the feeding vessel in the blood flow direction after the point and the sub vessels which are indicated during planning. The use of a high resolution medical image at the planning stage allows the use of low resolution live images when overlaying the live images at the treatment stage. By performing the overlaying, the planned position and the feeding vessels are clearly visible in the merged image, which provides the physician an orientation to move and place the catheter in said planned position.

By overlaying the images, the planned position along with the segmented vessels gets overlaid on the live image. The overlaying gives a clear idea to the physician who does a procedure on the effect of embolization performed in the planned position, because of the indications in the medical image shown in the fused image after the overlay. The overlaying guides the physician to instantly place a catheter in the planned position for applying the embolization material. This guidance makes the whole treatment process faster comparing to the existing method of finding a proper catheter position during treatment using contrast-enhanced image acquisitions.

The overlaying also comprises registration of the live image with the medical image. At step 308, the live image is registered with the medical image. The registration is required before obtaining a fused image if the medical image and the live images were acquired using different image modalities. Also any movements or change in the position of the patient during image acquisitions can be compensated during image registration.

At step 310, i.e during the actual intervention, the physician moves the catheter to a real position corresponding to the planned position. The indications in the fused image will provide guidance to move the catheter to the planned position. Guiding support is provided not only by the graphically marked planned catheter position but also by the indicated sub vessels in the medical image. During the intervention the live image is continuously updated and fused with the medical image to show the actual position of the catheter. At step 312, the embolization material is administered to the feeding vessel at the planned position of the catheter.

Figure 4:
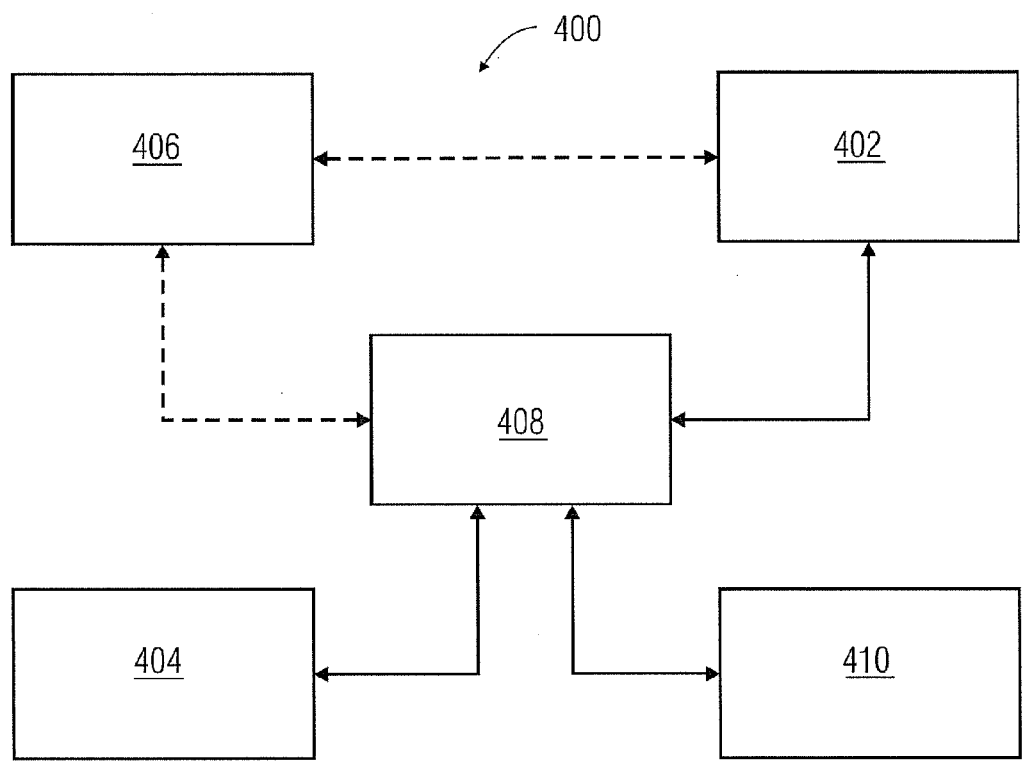
FIG. 4 illustrates a system for indicating a feeding vessel of a tumor in a medical image.

FIG. 4 illustrates a system 400 for indicating a feeding vessel of a tumor in a medical image. The system can be a standard computer with a software application running on it. The system 400 comprises a display 402 adapted to display the medical image 404 having a tumor and its surrounding vessels. A physician can manually select a portion of the medical image 404 in reference to the tumor using a selector 406. The selector 406, for example can be a graphic tool which can be used for highlighting or marking a specific portion in the medical image 404. The selector 406 is a functional element of the system which allows identifying a portion of the medical image by user interaction. The selector 406 can be realized as a feature of a software program executed on the system 400. The display 402 is connected to a processor 408, where said processor 408 is used for segmenting the feeding vessel of the tumor. The processor 408 segments the feeding vessel as explained in FIG. 1 or FIG. 2. The display 402 further indicates the segmented feeding vessel and sub vessel in the medical image and also is adapted to display an overlaid fused image having said medical image 404 and a live image 410 of the same tumor and the surrounding vessels which is obtained during or just prior to an embolizing procedure. The overlaying of the live image 410 to the medical image 404 is done by the processor 408. The display 402, is further adapted to display the complete segmented feeding vessel or a selected point in the feeding vessel or a part of the feeding vessel after said point in the direction of the blood flow or a sub vessel e.g. in different color or all of these or a combination of these features.

FIG. 5 to FIG. 9 shows a part of the medical image illustrated to emphasize the identification of a catheter location in the feeding vessel and the simulation of embolization according to the present invention. Based on the identification and simulation a physician can pre-plan the embolization procedure before the actual intervention.

Figure 5:
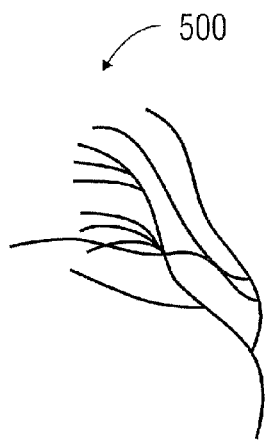
FIG. 5 illustrates a feeding vessel of a tumor in a medical image.

FIG. 5 illustrates a feeding vessel 500 of a tumor in a medical image. The image can be rendered for example using volume rendering technique (VRT) or maximum intensity projection (MIP). Blood vessels are only shown here for making the understanding of the invention clear, but practically the tumor and the surrounding vessels, which include the feeding vessel, are shown in the medical image. The feeding vessel 500, shown in FIG. 5 is a segmented feeding vessel. The segmented feeding vessel can be represented e.g. in color so as to distinguish itself from the background of the image.

Figure 6:
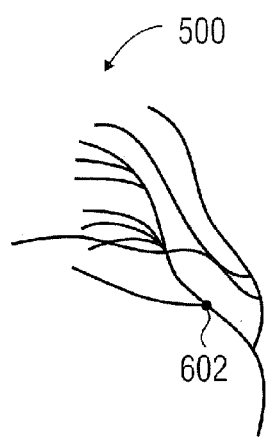
FIG. 6 illustrates the feeding vessel of a tumor with a marked planned catheter position.

FIG. 6 illustrates the same feeding vessel 500 of the tumor with a marked planned catheter position 602. The marking can be a graphical marking made using the selector. The marked planned position 602 is the initial position selected by the physician to see the simulation of embolization, considering that the embolization is done at that point. The simulation will give him an indication on the vessels affected by the embolization even prior to the actual intervention procedure.

Figure 7:
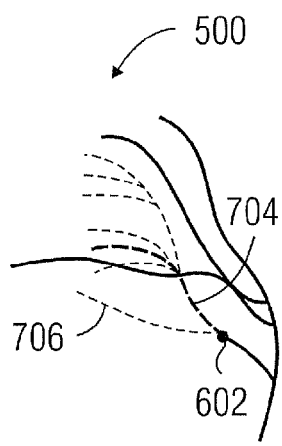
FIG. 7 illustrates the feeding vessel of a tumor with a marked planned catheter position along with distal feeding vessel branches.
Figure 8:
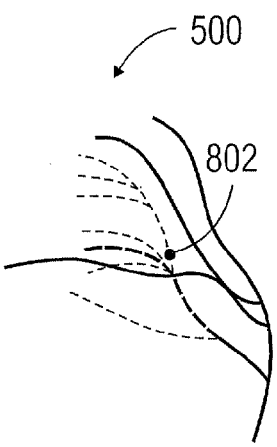
FIG. 8 illustrates the feeding vessel of a tumor with a repositioned planned catheter position.

FIG. 7 illustrates the feeding vessel 500 of the tumor with the marked planned catheter position 602 along with distal feeding vessel branches. The distal vessel branches after the position 602 are indicated along the blood flow direction e.g. in a different color to distinguish itself from rest of the feeding vessel and also from the background of the medical image. The indication of the distal vessel branches can also be in the form of dotted lines as indicated in FIG. 8. The distal vessel branches can have a main feeding branch 704 and sub vessels 706. In FIG. 7, the main feeding vessel 704 and sub vessels 706 can be indicated in different colors. In FIG. 7, the main feeding vessel 704 is represented by a thick dotted line and the sub vessels 706 by thin dotted lines for distinction.

FIG. 8 illustrates the feeding vessel 500 of the tumor with a repositioned planned catheter position 802. It could be seen that the initial planned catheter position in FIG. 7 is different when compared to the new catheter position in FIG. 8. The physician has done a remarking of the planned catheter position in the medical image. The advantage for the physician is that he can perform different iterations to visualize different simulation of embolization and finally select a more accurate catheter position which will not cutoff any major vessels feeding to the healthy tissues.

Figure 9:
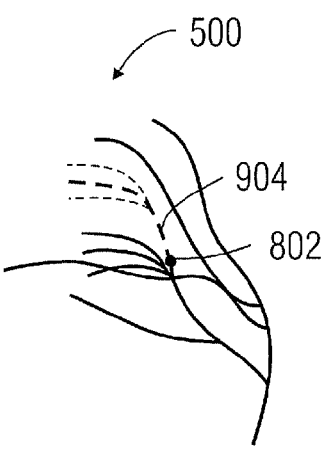
FIG. 9 illustrates the feeding vessel of a tumor with a repositioned planned catheter position and an updated display of distal vessel branches.

FIG. 9 illustrates the feeding vessel 500 of the tumor with the repositioned catheter position 802 and an updated display of distal vessel branches 904 based on said repositioning. The physician can do multiple repositioning until an optimal point is reached.

When considering an embolization of a feeding vessel of a tumor, the physician will be interested in plurality of factors. For example the vessel or vessels which needs to be embolized, the point at which the embolization material should be injected which will be the intended catheter position, the vessel parameters like the maximum curvature of the vessel, the smallest diameter of the vessel, the blood flow direction etc. In addition to the indication of the planned catheter position and the affected vessels along the blood flow direction which are affected by the embolization it will be useful if any critical vessel parameters also can be determined for the vessel. The vessel parameter, for example the maximum curvature and the smallest diameter of the vessel along the length of a vessel till the planned catheter position will help the physician take critical decision on the selection of the catheter type.

Having the indication of the segmented vessel in the medical image as proposed in the invention the physician can further use the medical image to find the maximum curvature of the vessel and plan the catheter type based on this parameter of the vessel prior to the actual intervention. The prior planning also helps to speed up the actual procedure, since the required catheter type for a given vessel can be determined before said procedure based on the maximum curvature information, as well as the smallest diameter.

Figure 10:
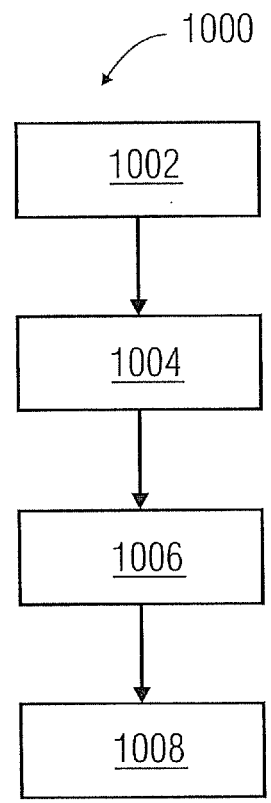
FIG. 10 illustrates a flow chart of a method for determining properties of a vessel in a medical image according to an embodiment of the invention.

Accordingly, FIG. 10 illustrates a flow chart 1000 of a method for deter wining properties of a vessel in a medical image. At step 1002, medical image of a vessel is displayed. The medical image is a high resolution image. At step 1004, the vessel displayed in the medical image is segmented. At step 1006, the segmented feeding vessel is then indicated in the medical image. And at step 1008, a maximum curvature along a length of the vessel is determined. The knowledge of the maximum curvature of the vessel, as well as the smallest diameter, helps the physician to make correct choice of the catheter having proper stiffness or flexibility which can be easily maneuvered through the vessel without much difficulty.

Figure 11:
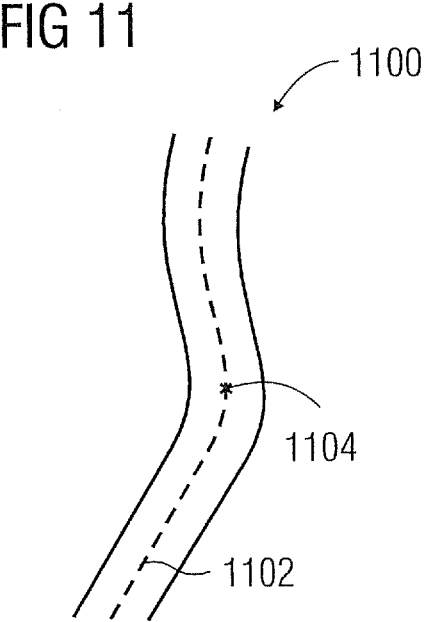
FIG. 11 shows a segmented vessel in a medical image, for which the maximum curvature is deter mined using the centerline.

Different methods could be employed to determine the maximum curvature of a blood vessel. FIG. 11 shows a segmented vessel 1100 in a medical image, for which the maximum curvature of the centerline 1102 is at point 1104. In said embodiment, the maximum curvature of the vessel 1100 corresponds to the maximum curvature of the centerline 1102 at the point 1104. This is one way to find the maximum curvature of a vessel or a selected part of the vessel.

Figure 12:
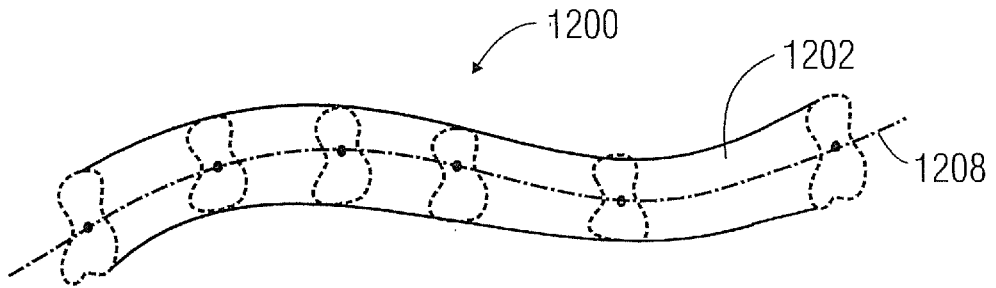
FIG. 12 shows a tubular structure, for which the maximum curvature is determined according to an embodiment of the invention.

FIG. 12 shows a segmented vessel 1200, which is having a tubular structure 1202 for which the maximum curvature needs to be determined. The tubular structure 1202 is segmented from a high resolution medical image, which provides the actual vessel situation inside a body part. In the case of the tubular structure, a centerline 1208 is first determined and an average diameter at different points of a centerline is determined. The maximum curvature can, for example, be based on the Gaussian curvature of the tubular structure or based on other appropriate definitions of the curvature.

Figure 13:
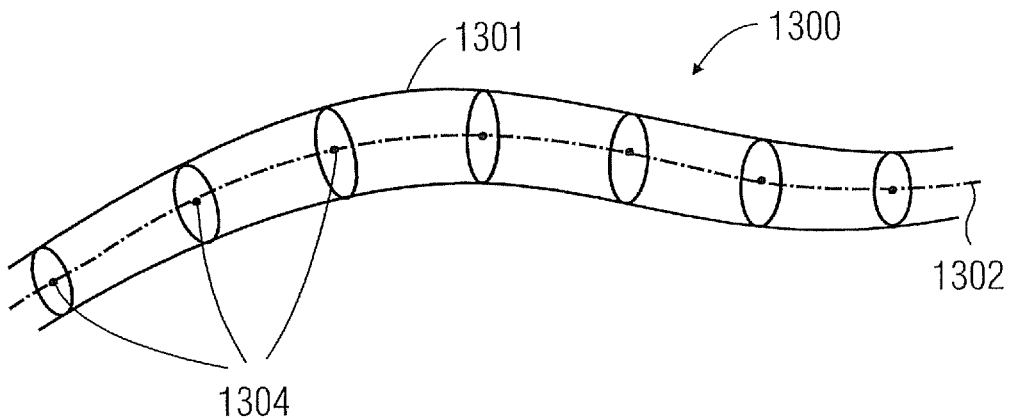
FIG. 13 shows an approximated tubular structure, for which the maximum curvature is determined according to an embodiment of the invention.

In another embodiment, FIG. 13 shows an approximated tubular structure 1300, obtained for the selected portion of a segmented vessel in the medical image. The vessel parameters are then determined for this approximated structure. In this embodiment, the centerline 1302 of the selected vessel 1301 is computed and then the average diameter of the vessel at different points 1304 along the centerline 1302 is computed. In the said above embodiments i.e. in the tubular structure or the approximated tubular structure the maximum curvature can also be taken as the maximum curvature of a path having shortest distance between two ends of the selected segmented vessel. In another embodiment, a curve inside a tubular structure is fitted such that its maximum linear curvature is minimal.

Determination of maximum curvature using centerline as explained using FIG. 11 does not require medical image of very high resolution, hence the said determination is preferred when the resolution of the medical image is relatively low. The accuracy of determined maximum curvature is highest when said determination is done using the tubular structure as explained using FIG. 12, since the tubular structure provides a real situation of the vessel inside a body part. At the same time said determination using the tubular structure requires a medical image of relatively high resolution. The maximum curvature determined using the approximated tubular structure as shown in FIG. 13 has an accuracy lesser than that of the one determined using the tubular structure but generally higher than that of the one determined using the center line, since the tubular structure is only an approximated model and not an actual vessel situation.

The smallest diameter information of the vessels is another vessel parameter which a physician might be interested in. Based on the above said embodiment, i.e. using the tubular structure, the smallest diameter information can be determined.

The present technique described hereinabove may also be used for indicating a feeding vessel of a malformation in a uterus region, liver or lungs in a medical image. As previously noted the malformation may include a tumor, a fibroid or any other malformation which may be benign or cancerous. For a uterus region a high resolution medical image of the uterus region is obtained by using an MRI, since the use of MRI for imaging minimizes exposure of radiation to the patient. The malformation and the feeding vessels are indicated in the medical image using the techniques described earlier with reference to FIG. 1. Thereafter, a live image which is a low resolution image is acquired. The live image is overlaid with the medical image to obtain a fused image, which contains the information regarding the location and extent of the malformation and the feeding vessels which helps the physician to see the actual position of the malformation and the feeding vessels before proceeding with the actual intervention. The described technique is useful for performing a uterine fibroid embolization technique, for treatment of fibroids present the uterus region of the patient. The information regarding the location of the malformation and the feeding vessel in the live image obtained from the overlay is helpful in guiding the physician to instantly place a catheter in a desired position for applying the embolization material. This guidance makes the whole treatment process faster compared to the existing method of finding a proper catheter position during treatment using contrast-enhanced image acquisitions.

In another embodiment, the selection of a point in the feeding vessel of a tumor according to step 110 in FIG. 1 can trigger the indication of the segmented feeding vessel along the blood flow for which vessel parameters like maximum curvature could be determined. Hence in this embodiment; instead of indicating the segmented feeding vessels in the blood flow direction as described in step 114 of FIG. 1, a portion of the feeding vessel is indicated in the opposite direction of the selected point. The vessel parameters, like the maximum curvature or smallest diameter of this indicated portion of the feeding vessel will be of interest to the physician for an intervention using a catheter.

Figure 14:
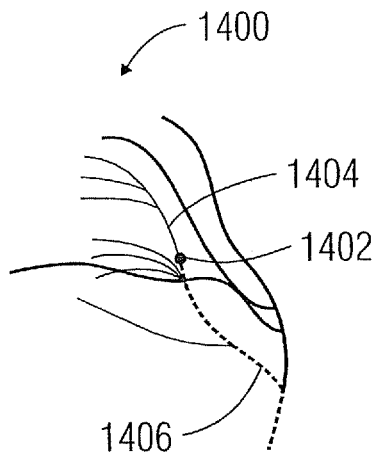
FIG. 14 illustrates a portion of a feeding vessel where vessel parameter is determined for the portion of a feeding vessel according to an embodiment of the invention.

FIG. 14 illustrates a feeding vessel 1400 and a point 1402 in the feeding vessel 1400 selected by the physician where the catheter can be positioned to inject an embolization material. Based on the selected point 1402, an indication of a portion 1406 of the feeding vessel 1400 can be provided in the medical image. The indicated portion 1406 is shown as a dotted line till the point 1402 and does not extend to distal vessel branches 1404 after the point 1402. The vessel parameters in the blood flow direction up to the selected point 1402 of the portion 1406 are taken into consideration, since this will provide critical guidance to the physician for an intervention procedure.

The proposed workflow for optimized detection and visualization of distal branches of a selected vessel, detection of vessel parameters like maximum curvature and smallest diameter offers many advantages. With the mentioned dedicated tool, which can be implemented as a software tool for marking and adjusting the planned position of the catheter as well as segmentation of the corresponding distal vessel branches, the actual treatment becomes much faster. Another advantage is that the planning steps can be performed before the intervention itself, without the need of a treatment setup.

The vessel is defined as any tubular anatomic structure of a human or an animal. In the embodiments described in reference to the figures the vessel is a blood vessel. However, the vessel can also be any other tubular structure including but not limited to bronchi, esophagus, and intestine.

Although the invention has been described with reference to specific embodiments, this description is not meant to be construed in a limiting sense. Various modifications of the disclosed embodiments, as well as alternate embodiments of the invention, will become apparent to persons skilled in the art upon reference to the description of the invention. It is therefore contemplated that such modifications can be made without departing from the embodiments of the present invention as defined.

The invention claimed is:

1. A method for indicating a feeding vessel of a malformation in a medical image, comprising:
displaying the medical image of the malformation and surrounding vessels by a display device;
manually selecting a portion of the displayed medical image in reference to the malformation by a selector;
segmenting the feeding vessel of the malformation by a processor;
indicating the segmented feeding vessel in the medical image by the display device,
manually selecting a point in the segmented feeding vessel indicated in the medical image by the selector as an initial catheter position for a simulation of embolization;
identifying a blood flow direction in the segmented feeding vessel by the processor;
indicating a part of the segmented feeding vessel in the blood flow direction after the selected point in the medical image by the display device; and
iteratively manually selecting a new point in the segmented feeding vessel displayed in the medical image to visualize different simulation of the embolization until an optimal point is reached by the selector, wherein the optimal point is reached so as to reduce cutoff of vessels that supply blood only to healthy tissue and to increase cutoff of vessels that supply blood to the malformation;
obtaining a live image of the malformation and the surrounding vessels during an intervention with a catheter to embolize the feeding vessel;
overlaying the live image with the medical image;
identifying a blood flow direction at the optimal point in the segmented feeding vessel by the processor; and
indicating a part of the segmented feeding vessel in the blood flow direction after the optimal point in the medical image by the display device, wherein the part of the segmented feeding vessel is blocked after the optimal point by releasing embolizing material at the optimal point.

2. The method according to claim 1, wherein the malformation is selected in the portion of the displayed medical image.

3. The method according to claim 1, further comprising determining a diameter of the feeding vessel in at least two places along a length of the feeding vessel, wherein the blood flow direction is identified as a direction of a decreasing diameter of the feeding vessel.

4. method according to claim 1, further comprising:
segmenting at least one sub vessel connected to the part of the feeding vessel in the blood flow direction after the point; and
indicating the segmented sub vessel in the medical image.

5. The method according to claim 1, wherein the feeding vessel is selected in the portion of the displayed medical image.

6. The method according to claim 5, further comprising:
selecting a point in the feeding vessel;
identifying a blood flow direction of the feeding vessel; and
indicating a part of the feeding vessel in the blood flow direction after the point in the medical image.

7. The method according to claim 6, further comprising determining a diameter of the feeding vessel in at least two places along a length of the feeding vessel, wherein the blood flow direction is identified as a direction of a decreasing diameter of the feeding vessel.

8. The method according to claim 6, further comprising:
segmenting at least one sub vessel connected to the part of the feeding vessel in the blood flow direction after the point; and
indicating the segmented sub vessel in the medical image.

9. The method according to claim 8, further comprising indicating the segmented feeding vessel and the segmented sub vessel in different colors.

10. The method according to claim 1, wherein the live image is registered with the medical image.

11. A system for indicating a feeding vessel of a malformation in a medical image, comprising:
a display device adapted to display the medical image having the malformation and surrounding vessels;
a selector for manually selecting a portion of the medical image in reference to the malformation; and
a processor for segmenting the feeding vessel of the malformation,
wherein the display device is further adapted to indicate the segmented feeding vessel in the medical image,
wherein the selector is adapted to select the portion of the medical image by selecting a point in the feeding vessel of the malformation as an initial catheter position for a simulation of embolization;
wherein the processor is adapted to identify a blood flow direction in the segmented feeding vessel;
wherein the display device is adapted to indicate a part of the segmented feeding vessel in the blood flow direction after the selected point in the medical image,
wherein the selector is further adapted to iteratively manually selecting a new point in the feeding vessel displayed in the medical image to visualize different simulation of the embolization until an optimal point is reached, wherein the optimal point is reached so as to reduce cutoff of vessels that supply blood only to healthy tissue and to increase cutoff of vessels that supply blood to the malformation;
wherein the processor is adapted to identify a blood flow direction of the segmented feeding vessel at the optimal point;
wherein the display device is adapted to overlay a live image of the malformation and the surrounding vessels with the medical image; and
wherein the display device is further adapted to indicate a part of the segmented feeding vessel in the blood flow direction after the optimal point in the medical image, wherein the part of the segmented feeding vessel is blocked after the optimal point by releasing embolizing material at the optimal point.

12. The system according to claim 11,
wherein the processor is adapted to segment at least one sub vessel connected to the feeding vessel; and
wherein the display device is further adapted to indicate the segmented sub vessel in the medical image.

* * * * *